United States Patent [19]

Fellerer

[11] Patent Number: 4,677,492
[45] Date of Patent: Jun. 30, 1987

[54] METHOD FOR THE INTERMEDIATE STORAGE OF FACSIMILE DATA OF GROUPS 2 AND 3

[75] Inventor: Josef Fellerer, Munich, Fed. Rep. of Germany

[73] Assignee: Siemens Aktiengesellschaft, Berlin and Munich, Fed. Rep. of Germany

[21] Appl. No.: 750,303

[22] Filed: Jul. 1, 1985

[30] Foreign Application Priority Data

Jul. 6, 1984 [DE] Fed. Rep. of Germany ....... 3424965

[51] Int. Cl.$^4$ .......................... H04N 1/32; H04N 1/41
[52] U.S. Cl. .................................... 358/257; 358/256; 358/280
[58] Field of Search ................ 358/256, 257, 280, 261

[56] References Cited

U.S. PATENT DOCUMENTS 4,454,575  6/1984  Bushaw ............................... 358/256
4,491,873  1/1985  Takayama ........................... 358/256

*Primary Examiner*—Howard W. Britton
*Attorney, Agent, or Firm*—Hill, Van Santen, Steadman & Simpson

[57] ABSTRACT

Facsimile data signal trains are transmitted from an originating station of Group 2 or Group 3 to a destination station Group 2 or Group 3 by way of an intermediate station. The scan line frequency of the facsimile data signal trains of the second group thereby amounts to n lines/second and m picture elements/line of the originals scanned whose information content is to be transmitted by facsimile data signal trains of Group 3. In the intermediate station, data signal trains of Group 2 are converted into data signal trains of Group 3 before intermediate storage and are subsequently intermediately stored, whereas data signal trains of Group 3 are intermediately stored without conversion. The data signal trains of Group 2 received in the intermediate station are converted into data signal trains of Group 3 before they are intermediately stored by demodulation, scanning with a frequency $T2 = m \times n$ Hertz and coding of the samples according to a redundancy-reducing source code method.

5 Claims, 1 Drawing Figure

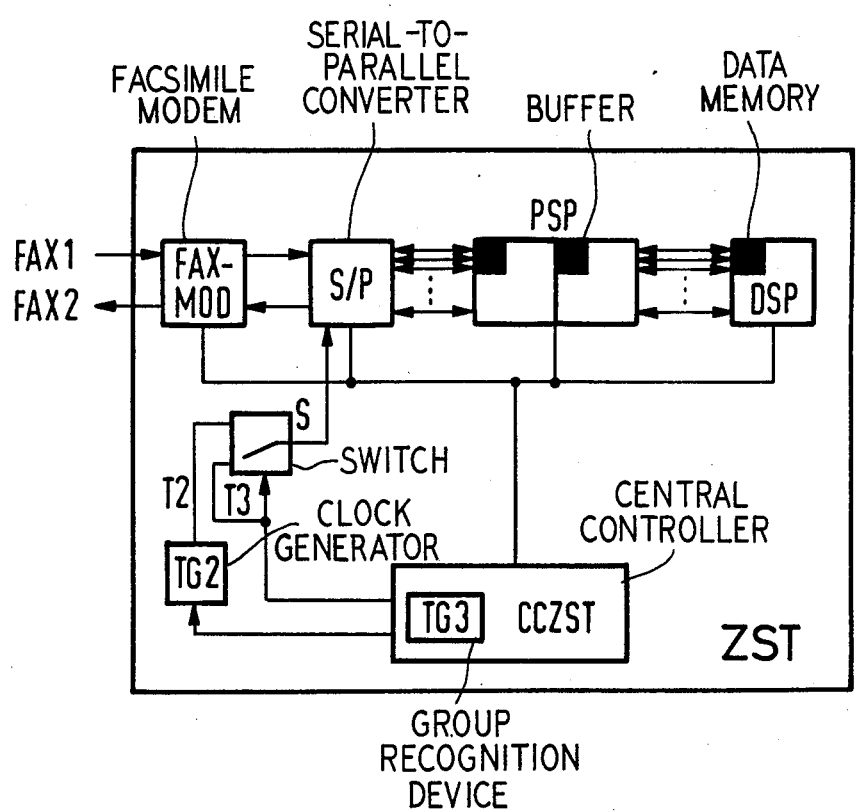

METHOD FOR THE INTERMEDIATE STORAGE OF FACSIMILE DATA OF GROUPS 2 AND 3

BACKGROUND OF THE INVENTION

1. Field of the Invention

The present invention relates to a method and apparatus for the intermediate storage of facsimile data of Groups 2 and 3, whereby facsimile data signal trains are transmitted from an originating station of Group 2 or Group 3 by way of an intermediate station to a designation station of Group 2 or Group 3, whereby the scan line frequency of the facsimile data of signal trains of the second group amounts to n lines/second, whereby m picture elements/line of the originals to have their information content transmitted by facsimile data signal trains of the Group 3 are scanned.

2. Description of the Prior Art

Facsimile apparatus of Group 2 and Group 3 are already well known in the art, whereby apparatus of the Group 3 can also realize functions of the apparatus of the Group 2. Apparatus of the Group 3 allow, on the one hand, the graphic reproduction of facsimile data signal trains of Group 2; on the other hand, they convert originals to be transmitted to apparatus of Group 2 into data signal trains of Group 2 (cf. Puhze, Schnelles Digitalkopieren mit dem Fernkopierer HF2060, Telcom Report 4 (1981) No. 5, pp. 385–391). An intermediate storage of Group 2 or Group 3 is only possible via the circuitous route of graphic reproduction of the data and of later reconversion of the graphic original into data signal trains.

SUMMARY OF THE INVENTION

The object of the present invention is to provide a method and an arrangement for intermediate storage of facsimile data of Group 2 and Group 3, whereby the data to be stored are not to be graphically reproduced and only a low storage capacity should be required.

According to the present invention, the above object is achieved in that a control information about the group affiliation of the originating station, Group 2 or Group 3, is supplied from the originating station to the intermediate station and data signal trains of Group 2 are converted into data signal trains of Group 3 before the intermediate storage of their information content in a data memory located in the intermediate station, whereas data signal trains of Group 3 are immediately stored in the data memory without conversion into other representational form.

The invention is particularly distinguished, on the one hand, by the advantage that the intermediate storage and the call-in of facsimile data signal trains are intermediately storable without their graphic reproduction and without scanning the carriers with the reproduced, graphic carriers and, on the other hand, by the advantage that the storing of the facsimile data signal trains in the representational form of Group 3 requires relatively little intermediate memory capacity and originating stations of Group 2 can transmit data signal trains via the intermediate station to designation stations of Group 3 with the relatively high rates of Group 3 and can therefore lead to a considerable reduction in the transmission costs given great distances between originating and destination stations.

The invention is further particularly distinguished by the advantage that the conversion of data signal trains of Group 2 into data signal trains of Group 3 can be carried out by sampling the former data signal trains with different frequencies in accordance with the desired accuracy of the later reproduction.

BRIEF DESCRIPTION OF THE DRAWING

Other objects, features and advantages of the invention, its organization, construction and mode of operation will be best understood from the following detailed description, taken in conjunction with the accompanying drawing, on which there is a single FIGURE which is a schematic block diagram representation of apparatus for carrying out the present invention.

DESCRIPTION OF THE PREFERRED EMBODIMENTS

Referring to the drawing, an arrangement is illustrated for intermediate storage of facsimile data of Group 2 and Group 3. It comprises a facsimile modem FAX-MOD, a series-to-parallel converter S/P connected to the modem, a buffer PSP connected to the converter, a data memory DSP connected to the buffer, a central controller CCZST having a device TG3 for the recognition of the control information regarding the group affiliation of the originating station FAX1, Group 2 or Group 3, supplied from the originating station FAX1 to the arrangement ZST, for controlling a clock generator TG2 effecting the generation of a clock having a frequency T2, for controlling the switch S which, insofar as the arrangement ZST is supplied with date signal trains of Group 2, through-connects the clock with the frequency T2 or, insofar as the arrangement ZST is supplied with data signal trains of the Group 3, through connects the clock T3 of the data signal trains of the Group 3 to the serial-to-parallel converter S/P.

Recommendations of the Comite Consultatif International Telegraphique et Telephonique (CCITT) subdivide telecopiers or facsimile apparatus into three different groups which differ, among other things, on the basis of their signal editing and the transmission rate resulting therefrom of the picture element information scanned from an original. Apparatus of Group 1 and Group 2 work in accord with analog techniques; the transmission time per A4 page amounts to 6 or, respectively, 3 minutes. The digitally operating apparatus of Group 3 enable lower transmission times dependent on the information set to be transmitted.

The facsimile transmission between apparatus of Groups 1, 2 and 3 occurs, as known, in a number of steps. First, the telephone connection for telecopying is set up in the manner usual for telephone operation. After switching of the telephone line to the telecopier, the so-called initiation phase follows in which the possible apparatus functions are identified and the operating methods are selected. Following thereupon is the actual document transmission. The so-called final phase contains the conclusion of the document transmission with the corresponding confirmation signals. Finally, a switch back to the telephone mode is undertaken.

During the document phase, the original is illuminated in punctiform fashion for scanning in an apparatus at the transmitting side. The reflected light, concentrated onto a photoelectric sensor via an optical system, generates electrical picture element signals corresponding to the contrast of the original, this being coded in the systems of Group 3, but otherwise being directly modulated by a modem and transmitted to an apparatus at the receiving side. After demodulation by a modem, the picture element signals are converted back into picture elements.

The transmission of only white and black picture elements, but not of gray scales, is realizable with facsimile apparatus of Group 3. High transmission rates are achieved by means of redundancy-reducing source coding methods. One group (run length) of respectively only white or only black contiguous picture elements of a line is represented by one code word, whereby white and black groups alternate. As a basic feature, a total of 1728 picture elements usually form a horizontal scan line 215 mm long. The method of the present invention, however, is not limited to these dimensions. Nor is it limited to a redundancy-reducing source coding method, for example the so-called modified Huffmann code.

The arrangement ZST is interposed between an originating station FAX1 and a destination station FAX2. The two stations FAX1, FAX2 can be facsimile apparatus of Group 2 and Group 3, whereby the scan line frequency of the facsimile data signal trains of the second group amounts to m lines/second and m picture elements/line of the originals to have their information content transmitted by facsimile data signal trains of Group 3 are scanned. The intermediate station ZST, therefore, can be supplied with data signal trains of Group 2 or Group 3 by an originating station FAX1 of Group 2 or Group 3; it is to communicate data signal trains of Group 2 or Group 3 to a destination station FAX2 of Group 2 or Group 3, whereby an information regarding the group affiliation of the destination station FAX2 is not extant at the time of the intermediate storage of the data signal trains. The intermediate storage of data signal trains of Group 2 and Group 3 could occur in a memory which comprises both memory capacity for data in the format of Group 2 and for data in the format of Group 3. It is such a structurally conditioned, high memory capacity which is to be avoided in accordance with the present invention. When the group affiliation of an originating station FAX1, Group 2 or Group 3, and the group affiliation of a destination station FAX2, likewise Group 2 or Group 3, is considered, then the following combinations 22, 23, 32 and 33 derive which illustrate the necessity of converting the data signal trains from the one into the other type of representation. In the arrangement ZST, all incoming data signal trains of Group 2 are converted into data signal trains of Group 3, whereas incoming data signal trains of Group 3 are intermediately stored without conversion into the other type of representation. With respect to the conversion of incoming data signal trains, the arrangement ZST behaves like a facsimile station of Group 3. When one now considers the group affiliation of an originating station FAX1, of the arrangement ZST and of a destination station FAX2, then the following combinations 232, 233, 332 and 333 derive which illustrate the necessity of conversion of data signal trains.

When the two combination sequences 22, 23, 32, 33 and 232, 233, 332, 333 are compared, it then turns out that an additional conversion of data signal trains of Group 2 into data signal trains of Group 3 and a corresponding reconversion by the arrangement ZST is only to be undertaken when originating and destination stations FAX1, FAX2 both belong to Group 2.

In the cases 23, 32 or, respectively, 233 and 332, the conversion otherwise to be undertaken in the destination station FAX2 of the Group 3 or, respectively, in the originating station FAX1 of Group 3 is executed in the arrangement ZST.

When the originating and destination stations FAX1, FAX2 both belong to Group 3, then a conversion does not occur in the arrangement ZST.

The facsimile modem FAX-MOD is supplied with control information by an originating station FAX1 regarding its group affiliation, Group 2 or Group 3, in the initial phase and this control information is recognized by the device TG3 in communication with the central controller CCZST.

When the arrangement ZST is supplied with data signal trains of Group 3, then the central controller CCZST switches the switch S so that the clock T3 of the data signal trains of Group 3 is connected through to the serial-to-parallel converter S/P. When the arrangement ZST is supplied with data signal trains of Group 2, then the central controller CCZST switches the controllable clock generator TG2 and the switch device S in such a manner that a clock having a frequency T2 is connected through to the serial-to-parallel converter S/P. The frequency T2 generated by the clock generator TG2 derives from the product of the line scan frequency of the facsimile data signal trains of the second group n lines/second, and from the number m of scanned picture elements/line of the originals to have their information content transmitted by facsimile data signal trains of Group 3. Both values n, m can be rigidly prescribed, for example n=6 lines/second and m=1,728 picture elements per line; or the two values n, m can be declared in the initial phase between the originating station FAX1 and the arrangement ZST.

In accordance with the invention, the scanning or sampling of data signal trains of Group 2 can also occur with a frequency $T2 = a \times m \times n$ Hertz, whereby "a" is the reciprocal of the minimum of white or, respectively, non-white picture elements respectively disposed side-by-side in a line of the originals to be transmitted. When, for example, it is assumed that at least two white or, respectively, non-white picture elements are disposed side-by-side in every line of the originals to be transmitted, then the data signal train of Group 2 which are to be converted can be scanned with a frequency $T2 = \frac{1}{2} \times m \times n$ Hertz in order to minimize the appearance of conversion errors. The central controller CCZST counts the scan pulses of a respective group of white or, respectively, non-white picture elements disposed side-by-side and assigns this number to a prescribed code, for example to the modified Huffmann code. Given the scanning of a data of Group 2 to be converted with a frequency $T2 = m \times n$ Hertz, for example $T2 = \frac{1}{2} \times m \times n$ Hertz, only the code words for 0, 2, 4, ... m identical picture elements disposed side-by-side are required from the set m of all code words provided in the appertaining code for the plurality of contiguous white or, respectively, non-white picture elements. Conversely, the appertaining code is to be augmented from m to 2 m code words when the scanning occurs with a frequency $T2 \leq 2m \times n$ Hertz.

The beginning and end of the signals to be scanned can be more precisely acquired with the assistance of higher scanning frequencies; on the other hand, the storing of additional samples requires increased memory capacity.

The central controller CCZST transmits the data converted in the serial-to-parallel converter from serial into parallel representation into the buffer PSP which, as shown on the drawing, can be composed of two portions, and executes the coding of the original data of Group 2 by scanning into a data of Group 3. The data encoded in this manner can be intermediately stored in a memory (not shown) which may be assigned to the central controller CCZST and can be subsequently stored in the data memory DSP. During the coding of the data stored in the one half of the buffer PSP, further data from the serial-to-parallel converter S/P are read into the other half of the buffer PSP. The processing of the second data occurs after the processing of the first data. The transmission of the information from the serial-to-parallel converter S/P into the buffer PSP preferably occurs with a hardware controller direct memory access which can be integrated into the central controller.

Data signal trains of Group 3 are not converted by the arrangement ZST and can be stepped into the data memory DSP without further processing. Dependent on the minimum line transmission time declared between the transmitting and receiving stations, however, data signal trains of Group 3 contain filler information which have no relationship to the content of the facsimile originals. Filling information can be distinguished from the remaining information of the facsimile data signal trains of Group 3 and can be blanked out before they are stepped in.

The call-in of the data stored in the data memory DSP in the representational form of Group 3 and their transmission to a destination station FAX2 occurs in an analogous manner; the data originally deposited in the data memory DSP are transmitted to a destination station FAX2 of Group 3 without prior conversion, after fading in filler information under given conditions; a reconversion of the data stored in the data memory DSP in the representational form of Group 3 into data of the representational form of Group 2 is necessary insofar as the destination station FAX2 is formed by a facsimile device of Group 2.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for intermediately storing facsimile data received as signal trains arbitrarily in a Group 2 format or a Group 3 format in response to a respective Group 2 or Group 3 control signal received from a transmitting station, the Group 2 facsimile data having a scan frequency of n lines per second and m picture elements per line, comprising:
    a facsimile modem for receiving and transmitting facsimile data signal trains;
    a converter connected to said modem for converting serial data signal trains received from said modem into parallel form and for converting parallel data into serial form for transmission by said modem, said converter including a clock input;
    storage means connected to said converter for storing data presented by said converter and for feeding stored data to said converter; and
    control means connected to said modem, to said converter, and to said storage means for controlling modulation, demodulation, conversion and storage, said control means comprising clock means for producing a clock frequency T2 and a clock frequency T3 respectively corresponding to the Group 2 and Group 3 formats, a switch connected to said clock input of said converter and operable to selectively connect the clock frequency T2 or the clock frequency T3 to said converter, and group recognition means connected to recognize the Group 2 and Group 3 control signals and connected to said switch and operable to control said switch in accordance with the format indicated by the control signal.

2. The apparatus of claim 1, wherein:
    said storage means comprises a bidirectional buffer connected to said converter and a data memory connected to said buffer.

3. A method for the intermediate storage of facsimile data arriving as signal trains in an intermediate station, the facsimile data trains arriving arbitrarily in the format of Group 2 and in the format of Group 3, the scanning frequency of the Group 2 format being at least n lines per second and having m picture elements per line of the original, comprising the steps of:
    transmitting a respective Group 2 control signal or a Group 3 control signal indicating the Group 2 or the Group 3 format;
    in response to a Group 2 signal, converting the received signal trains into the Group 3 format and intermediately storing the same for subsequent retransmission, the converting of data from the Group II format into the Group 3 format comprising the steps of demodulating the received data, scanning the data with a frequency $T2 = m \times n$ Hz, and coding the samples according to a redundancy source coding method; and
    in response to the Group 3 control signal, storing the facsimile data, without converting, for subsequent retransmission.

4. The method of claim 3, and further comprising the steps of:
    for transmitting the data stored in the Group 3 format to a Group 2 format destination station,
    converting the Group format data into the Group 2 format by decoding and modulating the same before retransmission.

5. A method for the intermediate storage of facsimile data arriving as signal trains in an intermediate station, the facsimile data signal trains arriving arbitrarily in the format of Group 2 and the format of Group 3 the scanning frequency of the Group 2 format being at least n lines per second and having m picture elements per line of the original, comprising the steps of:
    transmitting a respective Group 2 control signal or a Group 3 control signal indicating the Group 2 or the Group 3 format;
    in response to a Group 2 signal, converting the received signal trains into the Group 3 format and intermediately storing the same for subsequent transmission, the converting of the Group 2 format into the Group 3 format comprising the steps of demodulating the received signals, scanning the demodulated signals with a frequency $T2 = a \times m \times n$ Hz, where a is the reciprocal of the number of white or, respectively, non-white picture elements respectively disposed side-by-side in one line of the original, and coding the samples according to a redundancy-reducing source coding method; and
    in response to the Group 3 control signal, storing the facsimile data, without converging, for subsequent retransmission.

* * * * *